United States Patent [19]

Hiller et al.

[11] 3,961,189

[45] June 1, 1976

[54] DEVICE FOR MONITORING ACTIVITY OF GASES

[75] Inventors: Sigwart Hiller, Lauf; Harald Schad, Furth, both of Germany

[73] Assignee: Kraftwerk Union Aktiengesellschaft, Mulheim (Ruhr), Germany

[22] Filed: June 3, 1974

[21] Appl. No.: 475,930

[30] Foreign Application Priority Data
June 19, 1973 Germany............................ 2331209

[52] U.S. Cl................................. 250/304; 250/356
[51] Int. Cl.²........................................ G01N 31/00
[58] Field of Search............................ 250/304, 356

[56] References Cited
UNITED STATES PATENTS

| | | | |
|---|---|---|---|
| 3,646,346 | 2/1972 | Catt | 250/304 |
| 3,745,339 | 7/1973 | Starnes | 250/304 |
| 3,842,670 | 10/1974 | Brain | 250/356 X |

OTHER PUBLICATIONS

Precision Gamma−Ray Spectroscopy, etc., by Bowman et al., from *Nuclear Instru. and Methods*, vol. 103, No. 1, Aug. 15, 1972, pp. 61–67.

*Primary Examiner*—Archie R. Borchelt
*Attorney, Agent, or Firm*—Herbert L. Lerner

[57] ABSTRACT

Device for monitoring activity of gases in nuclear engineering installations, especially for metrologically registering iodine contained in exhaust air, includes gas-withdrawing lines, and a common measuring and evaluating station to which the gas-withdrawing lines are connected, the gas-withdrawing lines being formed of polytetrafluorethylene and being surrounded by a grounded metal jacket.

1 Claim, 1 Drawing Figure

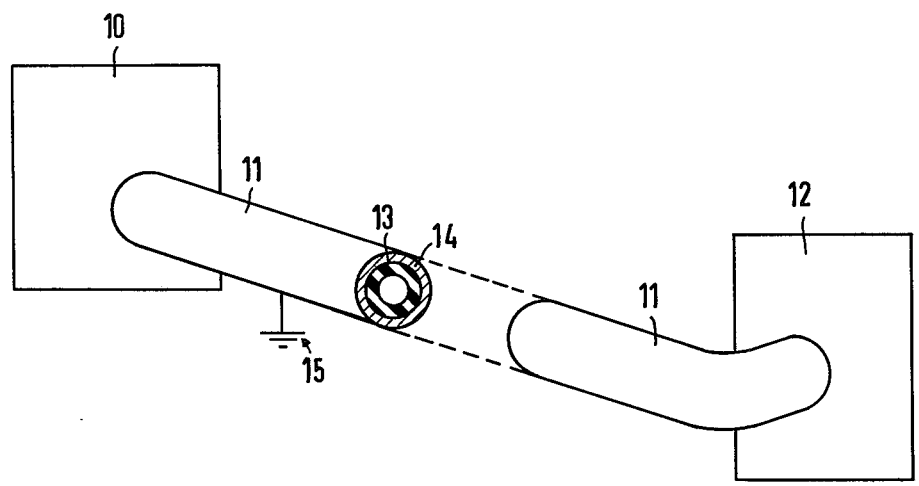

DEVICE FOR MONITORING ACTIVITY OF GASES

The invention relates to a device for monitoring activity of gases in nuclear engineering installations, especially for metrologically registering iodine contained in exhaust air and, more particulaly, to such device that is formed of gas-withdrawing lines that are connected to a common measuring and evaluating station.

The radioactive gases developed in nuclear engineering plants or installations are allowed to be released only in controlled manner into the surroundings in order thereby reliably to avoid damage to the environment. The maximum permissible dose can be measured with the aid of conventional measuring instruments in the pipelines through which the radioactive gas is conducted. These pipelines are often accessible only with great difficulty, however, so that it has become customary to connect so-called gas-withdrawing lines thereto and to feed the gas to a common measuring and evaluating station. It has been found, however, that deposits of radioactive material are formed in these gas-withdrawing lines, so that the values measured in the measuring station are not the same as in the withdrawing or outlet line leading in fact into the free air. To maintain the legal specifications or regulations with respect to not exceeding the maximum dose of radioactivity, it has therefore always been necessary, heretofore, to correct the data ascertained in the measuring and evaluating station by directly measured data, if possible.

This is associated with great difficulties, however, and also the accuracy of measurement that is attainable suffers thereby.

It is accordingly an object of the invention to provide a device for monitoring activity of gases which includes a common measuring and evaluating station to which supply lines are connected, wherein no radioactive deposits can form so that a correction of the measured value is no longer necessary.

With the foregoing and other objects in view, there is provided in accordance with the invention, a device for monitoring activity of gases in nuclear engineering installations, especially for metrologically registering iodine contained in exhaust air, the device including gas-withdrawing lines, and a common measuring and evaluating station to which the gas-withdrawing lines are connected, the gas-withdrawing lines being formed of polytetrafluorethylene and being surrounded by a grounded metal jacket. Such pipelines, which can have an inner diameter of 9 mm and an outer diameter of 12 mm, for example, are flexible and are therefore able to be relatively easily laid. Polytetrafluorethylene, which is known by the trade name Teflon, has so-called antistatic properties and should therefore be suited for the given purpose of the invention. It was apparent, however, that electrostatic charges appear which result in a deposition of radioactive material on the inner surface of the pipeline. The occurrence of this phenomenon was avoided by shunting or leaking off these electrostatic charges with the aid of a grounded metal casing disposed around the pipeline of polytetrafluorethylene or Teflon. It has been found, after lengthy series of measurements that actually no radioactive deposits occur any longer with the device of the invention, e.g., that the radioactivity measured at the inlet side is as large as that measured at the outlet side. Control measurements that are difficult to effect in practice for correcting the values ascertained in the measuring station are therefore no longer necessary.

Other features which are considered as characteristic for the invention are set forth in the appended claims.

Although the invention is illustrated and described herein as device for monitoring activity of gases, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the single FIGURE of the drawing which is a diagrammatic view partly broken away and in cross section, of the device for monitoring activity of gases in accordance with the invention.

Referring now to the drawing, there is shown therein diagrammatically a conventional nuclear engineering installation 10, from which a gas-withdrawing pipeline 11, constructed in accordance with the invention, extends to a conventional measuring and evaluating station 12 which determines, for example, the quantity of iodine contained in the waste or radioactive gas produced in the installation 10.

In accordance with the invention, the pipeline 11 is formed of a polytetrafluorethylene tube 13 which is clad with a metal jacket 14 that is grounded as shown diagrammatically at 15. A so-called screen or shield tube, which is formed of metal netting or fabric, can be used as the grounded metal jacket 14.

It should be noted that only polytetrafluorethylene or Teflon alone of a multiplicity of tested metallic and non-metallic materials was found to be suited for meeting and requirements of the invention of the instant application.

We claim:

1. Device for monitoring activity of gases in nuclear engineering installations, especially for metrologically registering iodine contained in exhaust air, the device comprising gas-withdrawing lines, and a common measuring and evaluating station to which said gas-withdrawing lines are connected, said gas-withdrawing lines being formed of polytetrafluorethylene and being surrounded by a grounded metal jacket to prevent deposition of radioactive material from said gases on the inner surface of said gas-withdrawing lines.

* * * * *